Oct. 30, 1962

T. PACKARD 3,061,031

ELECTRICALLY PROPELLED SERVICE CART

Filed Sept. 8, 1961

INVENTOR.
Theodore Packard
BY
Scott L. Norvied

United States Patent Office 3,061,031
Patented Oct. 30, 1962

3,061,031
ELECTRICALLY PROPELLED SERVICE CART
Theodore Packard, 2711 W. Colter St., Phoenix 17, Ariz.
Filed Sept. 8, 1961, Ser. No. 136,790
3 Claims. (Cl. 180—26)

This invention concerns an electrically propelled service cart.

One of the objects of the invention is to provide a service cart that can be used for dispensing ice cream or similar items which is electrically driven by driving wheels at the front of the vehicle which also act to guide the vehicle.

Another object is to provide an electrically driven service vehicle which has dual steering wheels at the front which are driven through the steering column and are spaced close together to avoid the necessity of a differential.

Still another object is to provide an electrically driven service cart which has dual driving wheels at the front which are supported on a short transverse shaft that is driven by a vertical shaft journalled in a steering column; said steering column being supported by the frame of the machine so that the frame will slide up and down on the steering column and eliminate the need for separate spring suspension.

Another object is to provide a steering column for the vehicle above described wherein the spring suspension consists in oppositely positioned coil springs arranged to support the weight of the front and of the vehicle on the steering column while at the same time the vehicle is driven by a shaft journalled within the steering column and communicating motion through bevel gears to a short driving wheel axle to which the front driving and steering wheels are keyed.

Still another object is to provide, in the device above described, a propulsion motor supported on a frame at the top of the steering column.

A further object is to provide steering means consisting of a steering wheel shaft having an internal bore threaded to retractably receive a screw coupled to the top portion of the steering column.

Other objects will appear hereinafter.

I attain the foregoing objects by means of the parts, devices and combinations of parts shown in the accompanying drawings, in which—

Similar numerals refer to similar parts in the several views.

Figure 1:
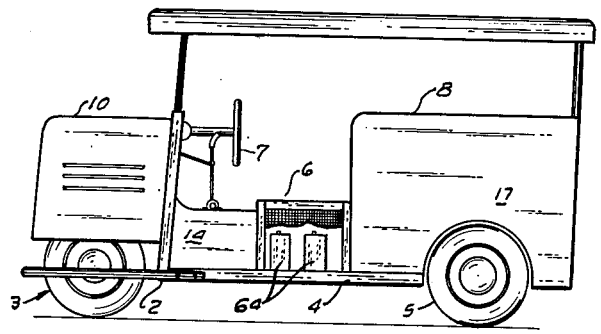
FIGURE 1 is a side elevational view of a cart type vehicle incorporating my improvements and illustrating the type of vehicle to which my improvements apply.
Figure 2:
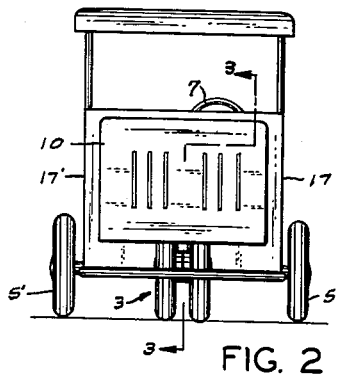
FIGURE 2 is a front elevational view thereof.

The devices and parts hereinafter mentioned are best applied to a vehicle, such as is shown in FIGURES 1 and 2 and which has dual propulsion in steering wheels 3 at the front end 2 of the body or bed 4 and two spaced rear wheels 5 in the rear end of said body. The vehicle has a seat space 6 and a steering wheel 7 disposed forward of the seat. This arrangement leaves a comparatively large space 8 in the rear portion of the vehicle which may be used for carrying refrigeration apparatus and storage bins and the like for frozen confections.

At the front, a hood 10 covers the front wheels and working parts.

Beneath the front hood 10 there is a front wheel suspension generally indicated by numeral 12. This consists of an extension plate 14 which is centrally attached to and extends forward from the body 4. Fire wall or dash plate 15 is the forward terminus of the body part 16 and is substantially attached to the two side body side members 17 and 17'. The extension plate 14 has a supporting tube 20 attached to its front end which houses and forms a bearing support for the steering column 22. The steering column is journalled within the tube 20 by bushings 23 and 24 at the top and bottom, respectively.

At the top of the steering column 22 there is a plate 26 which is keyed to and turns with the column. This plate has a forward extension 54 which affords support for the propulsion motor 27. This plate also houses anti-friction bearings 28, which journal the drive shaft 35.

Steering is provided by a pin 30, eccentrically positioned on plate 26 and pivotally connected to a screw 31 which is retractable within steering wheel shaft 32. The steering wheel 33 turns an internally threaded sleeve 32 which either retracts or ejects screw 31. In this way the eccentrically positioned pin 30 is pushed forwardly or rearwardly to turn the column 22 for steering. The pitch of the threads is shallow so that motion from plate 26 and column 22 is not communicated to sleeve 32.

Column 22 is hollow and within it the vertical drive shaft 35 is journalled on bearings 28 at the top and 36 at the bottom. At the bottom end of the drive shaft 35 there is a bevel drive gear 37 which meshes with a driven ring gear 38 keyed to a short transverse axle shaft 40 on which the two driving and steering wheels 41 and 42 are keyed.

A housing 44 encloses the bevel gears and also the central portion of axle shaft 40. Bearings for the axle shaft 40 are provided at 45 within each end of the housing 44. It will be noted that axle shaft 40 is solid and that the two driving wheels 41 and 42 are keyed to its ends. Due to the fact that they are comparatively closely positioned no differential is ordinarily needed.

On each side of the tubular portion 20 there are eyes 50. These receive the lower ends of springs 51 and 52, respectively. The upper ends of these springs are hooked into eyes 53 on plate 26 which is, as above explained, keyed onto the steering column 22. In this way the front end of the vehicle is resiliently supported on plate 14 which is on the steering column shaft.

On top of the drive shaft 35, I attach and key a pulley 60. This is driven by belt 61 from the motor pulley 62.

Figure 6:
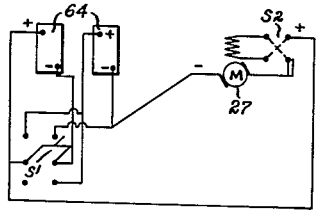
FIGURE 6 is an electrical diagrammatic figure showing the connections between the battery switch and motor.
Figure 4:
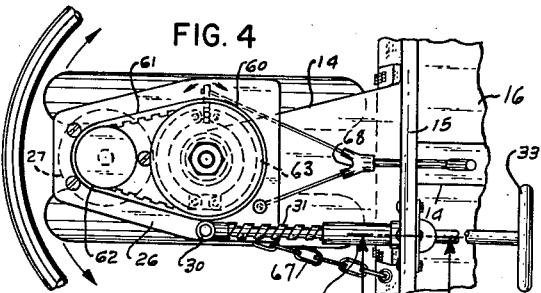
FIGURE 4 is a plan view of the front end of a vehicle such as shown in FIGURE 1, drawn on an enlarged scale and with parts broken away to better show the interior structure.
Figure 5:
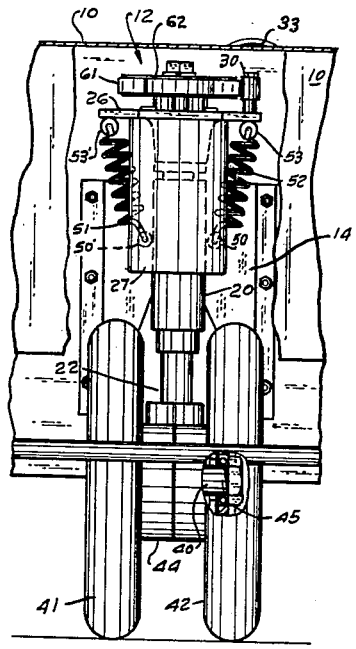
FIGURE 5 is a front elevational view of the front end of the vehicle as shown in FIGURE 3.
Figure 3:
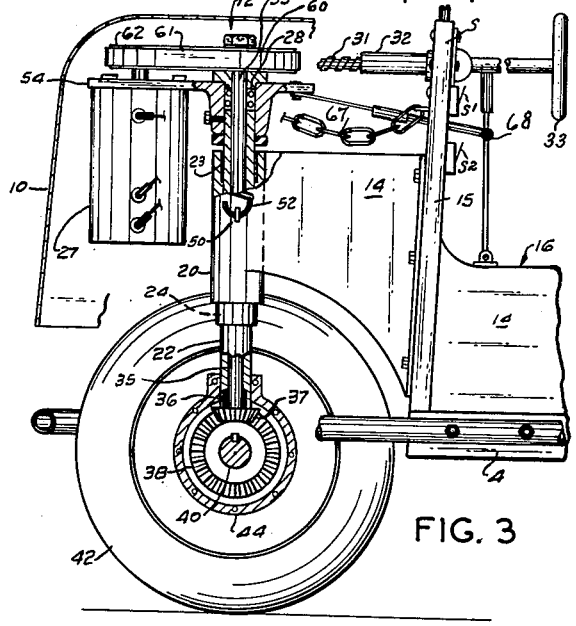
FIGURE 3 is a side elevational sectional view of the front end portion of a vehicle incorporating my improvements, taken substantially on line 3—3 of FIGURE 2 and drawn on an enlarged scale.
Figure 7:
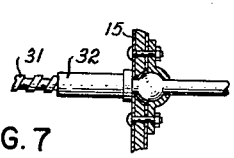
FIGURE 7 is a section taken on line 7—7 of FIGURE 4.

In FIGURE 6 a double throw blade speed control switch S–1 is indicated, which is connected between motor 27 and batteries 64 so that they may be connected to the motor either in parallel, to produce low speed or in series to produce high speed. Switch S–2 is of the conventional field and armature reversing type to attain reversal of motor 27; S–1 and S–2 are control switches.

Since the motor is of the reversing direct current type no reversing gears are necessary. Since, also, the motor can be controlled by switching the current from batteries 64 so that batteries may be either connected in series or in parallel to motor 27, by switch S-1 which can be used to regulate the speed of the motor. This structure eliminates the necessity for gearing to control the speed of the vehicle and also to take care of reversing the vehicle. The drive is thus direct through the belt 61 to the drive shaft 35, and from this drive shaft to the axle shaft 40 and drive wheels 41 and 42.

The above structure provides a compact and efficient combined drive and steering mechanism which is disposed at the front end of the vehicle body 2.

It will be noted that the two suspension springs 51 and 52 are connected from the eyes 50 on each side of the steering column support to slightly eccentrically positioned eyes 53 on plate 26. This structure tends to place the strain on the springs when they are moved either right or left from the straight front driving position. The springs tend to aid in driving in a straight line by tending to urge the steering column to a straight front or mid position. Furthermore, due to the fact that the steering column tube 20 can be placed at a slight angle with reference to the vertical with its top canted somewhat to the front, steering is aided because the wheel, either 41 or 42, as the case may be, on the outside of the turn is lifted slightly from the ground. It therefore slides easier than the opposite wheel which is in firm contact with the ground and acts more like a pivot. In this way there is little drag between the wheels during steering. Also, as above explained, the steering tends to neutralize itself and assume the straight front mid position when the steering wheel is released. However, steering movement is not communicated to the steering wheel 33 to any appreciable extent because of the non-reversible pitch of the screw 31. Chain 67 is used to limit the right turning movement of the steering assembly. Turning movement to the left is limited by bottoming the threaded rod in the steering shaft sleeve.

Braking can be applied to the front wheels by brake shoes 63 within the rim of pulley 60, and is applied through lever and cable 68, but is also applied to the rear wheels 5, when desired.

With this structure, as above explained, the floor of the rear part of body or bed 2 can be flat and comparatively near to the ground. There are no obstacles to interfere with placing or removing devices on the rear portion of the body and the major portion of the weight of the load can be placed so that it is centrally balanced within the area of all wheels, front and rear.

I claim:

1. An electrically propelled service cart having a body with a bed having rear wheels thereon, a fire wall plate at the front of said body, a goose neck plate centrally disposed on and extending forward from said fire wall, a supporting tube at the front of said goose neck plate, a tubular steering column journalled in said tube having a gear case at the bottom and a supporting plate at the top, a drive shaft journalled in said column having a pulley at the top and a bevelled gear at the bottom, an axle shaft extending transversely in said gear case having a ring gear meshing with said bevelled gear, front drive and steering wheels keyed to the ends of said transverse shaft, an electric motor attached to said supporting plate and connected to said drive shaft by belt and pulley means, steering means including a steering shaft extending through said fire wall and having an internally threaded sleeve at its forward end, a threaded rod screwed into said sleeve at its rear and pivotally mounted on said supporting plate at the forward end, and a steering wheel on the rear end of said shaft.

2. An electrically propelled service cart having a body with a bed having laterally disposed rear wheels thereon, a fire wall plate at the front of said body, a goose neck plate centrally disposed on and extending forward from said fire wall, a substantially vertical supporting and bearing tube attached to the front of said goose neck plate, a tubular steering column journalled in said supporting tube, a gear case attached to the bottom of said steering column having openings for a transverse front wheel axle shaft, a supporting plate keyed to the top of said steering column having an eccentrically positioned bearing pin on its top face, springs attached to each side of said bearing supporting tube, extending upwardly and attached to the underside of said supporting plate at diametrically opposite points spaced radially outward from the center of said tube, an electric motor having a belt pulley, attached to the bottom face of said supporting plate and depending therebelow, a vertical drive shaft journalled in said steering column extending from the top of said column to said gear case, a driven pulley keyed to the top of said drive shaft, belt means driving said driven pulley from said motor pulley, a bevel gear keyed to the bottom end of said shaft, a horizontal axle shaft journalled in said gear case, a ring bevel gear keyed to said axle shaft and meshing with the bevel gear on said drive shaft, steering and drive wheels keyed onto the ends of said horizontal axle shaft, steering means including a steering shaft having a steering wheel at the rear end, and extending through and journalled in said fire wall plate, and having a threaded bore within its front end portion and a threaded rod pivotally supported on said eccentrically disposed bearing pin on said steering column supporting plate and threaded into the bore in the front end portion of said steering shaft, an electrical battery on said cart body connected in circuit with said motor through switches on said body.

3. The device described in claim 2 wherein said driven pulley has a rim with a braking surface, in combination with brake shoes, operative on said rim anchored on said supporting plate, and operated through cables by lever means on said cart body.

References Cited in the file of this patent

UNITED STATES PATENTS

| 2,779,425 | Miller | Jan. 29, 1957 |
| 2,879,859 | Swisher | Mar. 31, 1959 |
| 2,923,365 | McKechnie | Feb. 2, 1960 |